United States Patent
Jin et al.

(10) Patent No.: US 10,917,831 B2
(45) Date of Patent: Feb. 9, 2021

(54) RADIO ACCESS NETWORK SLICE GENERATION METHOD, RADIO ACCESS NETWORK, AND SLICE MANAGER

(71) Applicant: HUAWEI TECHNOLOGIES CO., LTD., Shenzhen (CN)

(72) Inventors: Yinghao Jin, Shanghai (CN); Hong Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/167,620

(22) Filed: Oct. 23, 2018

(65) Prior Publication Data

US 2019/0075512 A1 Mar. 7, 2019

Related U.S. Application Data

(63) Continuation of application No. PCT/CN2017/075780, filed on Mar. 6, 2017.

(30) Foreign Application Priority Data

Apr. 23, 2016 (CN) .......................... 2016 1 0257629

(51) Int. Cl.
*H04W 48/08* (2009.01)
*H04W 28/24* (2009.01)
(Continued)

(52) U.S. Cl.
CPC .......... *H04W 48/08* (2013.01); *H04W 16/02* (2013.01); *H04W 24/10* (2013.01); *H04W 28/16* (2013.01);
(Continued)

(58) Field of Classification Search
None
See application file for complete search history.

(56) References Cited

U.S. PATENT DOCUMENTS 10,425,830 B2 * 9/2019 Song .................... H04W 48/20
2012/0233302 A1 * 9/2012 Kallin ................ H04L 41/5025
709/221

(Continued)

FOREIGN PATENT DOCUMENTS

CN 104320787 A 1/2015
CN 105357099 A 2/2016
(Continued)

OTHER PUBLICATIONS

S2-161833 ETRI, "High-level Functional Architecture for the Network Slicing", SA WG2 Meeting #114, Apr. 11-15, 2016, Sophia Antipolis, France, total 4 pages.
(Continued)

*Primary Examiner* — Kodzovi Acolatse
(74) *Attorney, Agent, or Firm* — Kilpatrick Townsend & Stockton LLP

(57) ABSTRACT

This patent application discloses a radio access network slice generation method, a radio access network, and a slice manager. The method includes: receiving, by a radio access network, a radio access network slice generation request message sent by a slice manager; and generating, by the radio access network, a radio access network slice. The radio access network slice generation request message includes information about a service type, and a protocol stack corresponding to the service type is configured for the radio access network slice. In this patent application, there is no need to repeatedly deploy different radio access networks to meet different service types, and therefore operating expenses are reduced. The radio access network slice may be quickly generated, and this facilitates rapid deployment of a new service.

18 Claims, 12 Drawing Sheets

(51) Int. Cl.
*H04W 16/02* (2009.01)
*H04W 24/10* (2009.01)
*H04W 28/16* (2009.01)
*H04W 48/18* (2009.01)
*H04W 88/16* (2009.01)
*H04W 28/26* (2009.01)

(52) U.S. Cl.
CPC ........... *H04W 28/24* (2013.01); *H04W 48/18* (2013.01); *H04W 88/16* (2013.01); *H04W 28/26* (2013.01)

(56) References Cited

U.S. PATENT DOCUMENTS

| 2015/0237508 | A1  | 8/2015  | Wang et al. |              |
|--------------|-----|---------|-------------|--------------|
| 2017/0070892 | A1* | 3/2017  | Song        | H04L 41/042  |
| 2017/0086118 | A1* | 3/2017  | Vrzic       | H04W 36/26   |
| 2017/0135099 | A1* | 5/2017  | Song        | H04W 76/25   |
| 2017/0141973 | A1* | 5/2017  | Vrzic       | H04W 24/08   |
| 2017/0164349 | A1* | 6/2017  | Zhu         | H04W 48/18   |
| 2017/0289270 | A1* | 10/2017 | Li          | H04L 41/0803 |
| 2017/0318468 | A1* | 11/2017 | Aijaz       | H04W 16/10   |
| 2018/0249513 | A1* | 8/2018  | Chang       | H04B 7/26    |
| 2018/0376414 | A1* | 12/2018 | Zeng        | H04W 8/02    |
| 2019/0014515 | A1* | 1/2019  | Zee         | H04W 36/08   |
| 2019/0037409 | A1* | 1/2019  | Wang        | H04W 16/04   |
| 2019/0045351 | A1* | 2/2019  | Zee         | H04W 76/11   |

FOREIGN PATENT DOCUMENTS

| CN | 105516312 A | 4/2016 |
| JP | 2013179494 A | 9/2013 |

OTHER PUBLICATIONS

Chairman, FG IMT-2020, "FG INIT-2020: Report on Standards Gap Analysis"—Study Group 13 TD 208 (PLEN/13), International Teleco1vimunication Union, Telecommunication Standardization Sector Study Period 2013-2016, total 172 pages.

Takuya Shimojo, "Future Mobile Core Network for Efficient Service Operation", 2015 IEEE, total 6 pages.

3GPP TR 23.720 V13.0.0 (Mar. 2016),3rd Generation Partnership Project;Technical Specification Group Services and System Aspects;Study on architecture enhancements for Cellular Internet of Things(Release 13),total 94 pages.

* cited by examiner

RADIO ACCESS NETWORK SLICE GENERATION METHOD, RADIO ACCESS NETWORK, AND SLICE MANAGER

CROSS-REFERENCE TO RELATED APPLICATIONS

This application is a continuation of International Application No. PCT/CN2017/075780, filed on Mar. 6, 2017, which claims priority to Chinese Patent Application No. 201610257629.3, filed on Apr. 23, 2016. The disclosures of the aforementioned applications are hereby incorporated by reference in their entireties.

TECHNICAL FIELD

This patent application relates to the communications field, and more specifically, to a radio access network slice generation method, a radio access network, and a slice manager.

BACKGROUND

With rapid development of wireless communication, a plurality of differentiated services coexist in a future wireless communications network. These services are greatly differentiated in performance requirements. Networks that support different service types are different in speed, performance, security, reliability, latency, and the like. For example, for a multiparty high-definition video service, a large bandwidth requirement needs to be met, to provide a high service rate, and a Narrowband Internet of Things (Narrowband Internet of Things, NB-IoT) service does not impose a strict requirement on quality of service (Quality of Service, QoS) of a network, that is, does not require a very high data rate and a very low latency, but requires a high endurance capability and massive connections. A conventional cellular network processes service data by using a uniform data processing method, and cannot provide differentiated services. However, in a future communications system, customized services need to be provided for different services. There is currently no proper solution to how to quickly deploy radio access networks for different types of services.

SUMMARY

This patent application provides a radio access network slice generation method, a radio access network, and a slice manager, to quickly deploy radio access networks for different types of services.

According to a first aspect, this patent application provides a radio access network slice generation method. The method includes: receiving, by a radio access network, a radio access network slice generation request message sent by a slice manager; and generating, by the radio access network, the radio access network slice. The radio access network slice generation request message includes information about a service type, and a protocol stack corresponding to the service type is configured for the radio access network slice.

In this patent application, after receiving a radio access network slice generation request, the radio access network (Radio Access Network, RAN) generates the RAN slice. The generation request includes the service type, and the protocol stack corresponding to the service type is configured for the radio access network slice. In this patent application, there is no need to repeatedly deploy different radio access networks to meet different service types, and therefore operating expenses are reduced. The RAN slice may be quickly generated, and this facilitates rapid deployment of a new service.

With reference to the first aspect, in a first possible implementation of the first aspect, before the receiving, by a radio access network, the radio access network slice generation request message sent by the slice manager, the method further includes: receiving, by the radio access network, a trigger measurement control message sent by the slice manager; and sending, by the radio access network, a measurement report message to the slice manager. The trigger measurement control message includes a trigger condition, the measurement report message includes the service type, and the service type meets the trigger condition. By using the foregoing technical solution, the RAN may automatically trigger establishment of a slice, specifically, based on the trigger condition. Resource utilization is improved because of real-time performance.

With reference to the first aspect or the first possible implementation of the first aspect, in a second possible implementation of the first aspect, the radio access network slice generation request message further includes information about a quality of service requirement. The generating, by the radio access network, the radio access network slice includes: when the protocol stack is configured for the radio access network slice and an available resource of the radio access network meets the quality of service requirement, generating, by the radio access network, the radio access network slice. By using the foregoing technical solution, the RAN may know a resource required when the RAN generates the corresponding RAN slice, and determine, based on the available resource, whether to generate the corresponding RAN slice. Therefore, a risk that although the corresponding RAN slice is generated, quality of service of a user cannot be met because of insufficient resources is reduced.

With reference to any one of the first aspect, or the foregoing possible implementations of the first aspect, in a third possible implementation of the first aspect, after the generating, by the radio access network, the radio access network slice, the method further includes: sending, by the radio access network, system update information to a terminal device. The system update information includes the service type. By using the foregoing technical solution, the RAN notifies the terminal device of a service type supported by the RAN, so that the terminal device selects a proper RAN to access, thereby improving a throughput of the terminal device and shortening a latency.

With reference to any one of the first aspect, or the foregoing possible implementations of the first aspect, in a fourth possible implementation of the first aspect, before the generating, by the radio access network, the radio access network slice, the method further includes: sending, by the radio access network, a radio access network slice access request message to a gateway; and receiving, by the radio access network, a radio access network slice access response message sent by the gateway. The radio access network slice access request message includes the service type, and the radio access network slice access response message is used to indicate that the gateway allows access of the radio access network slice. By using the foregoing technical solution, a proper gateway may be selected for a to-be-generated RAN slice. In addition, redundant processing caused by creating the RAN slice in a scenario in which no proper gateway can be accessed is avoided.

With reference to any one of the first aspect, or the foregoing possible implementations of the first aspect, in a fifth possible implementation of the first aspect, the radio access network slice generation request message further includes information about a radio access network slice establishment and retention priority. A priority is set, so that in a resource-constrained scenario, performance of a RAN slice with a higher priority can be ensured, for example, by releasing a RAN slice with a lower priority, thereby ensuring quality of service of a user with a higher priority. When a RAN slice is to be created, a RAN slice with a higher priority may be first created.

With reference to any one of the first to the fifth possible implementations of the first aspect, in a sixth possible implementation of the first aspect, the radio access network slice generation request message further includes identification information of the gateway. By using the foregoing technical solution, if the RAN slice generation request message includes the identification information of the gateway, the RAN may send a RAN slice access request message to a specified gateway, to reduce an amount of transmitted signaling.

With reference to any one of the first aspect, or the foregoing possible implementations of the first aspect, in a seventh possible implementation of the first aspect, the radio access network slice generation request message further includes information about the protocol stack. By using the foregoing technical solution, the information about the protocol stack is added to the RAN slice generation request message, so that the protocol stack corresponding to the service type can be obtained without signaling, thereby reducing an amount of transmitted signaling.

With reference to any one of the first aspect, or the foregoing possible implementations of the first aspect, in an eighth possible implementation of the first aspect, after the generating, by the radio access network, the radio access network slice, the method further includes: sending, by the radio access network, a radio access network slice generation response message to the slice manager, where the radio access network slice generation response message is used to indicate that the radio access network generates the radio access network slice.

According to a second aspect, this patent application provides a radio access network slice generation method. The method includes: sending, by a slice manager, a radio access network slice generation request message to a radio access network; and receiving, by the slice manager, a radio access network slice generation response message sent by the radio access network. The radio access network slice generation request message includes information about a service type. The radio access network slice generation response message is used to indicate that the radio access network generates a radio access network slice. A protocol stack corresponding to the service type is configured for the radio access network slice.

With reference to the second aspect, in a first possible implementation of the second aspect, before the sending, by a slice manager, the radio access network slice generation request message to the radio access network, the method further includes: sending, by the slice manager, a trigger measurement control message to the radio access network; and receiving, by the slice manager, a measurement report message sent by the radio access network. The trigger measurement control message includes a trigger condition. The measurement report message includes the service type, and the service type meets the trigger condition.

With reference to the second aspect or the first possible implementation of the second aspect, in a second possible implementation of the second aspect, the radio access network slice generation request message further includes information about a quality of service requirement. That the radio access network generates the radio access network slice includes: when the protocol stack is configured for the radio access network slice and an available resource of the radio access network meets the quality of service requirement, generating, by the radio access network, the radio access network slice.

With reference to any one of the second aspect, or the foregoing possible implementations of the second aspect, in a third possible implementation of the second aspect, the radio access network slice generation request message further includes identification information of a gateway.

With reference to any one of the second aspect, or the foregoing possible implementations of the second aspect, in a fourth possible implementation of the second aspect, the radio access network slice generation request message further includes information about the protocol stack.

According to a third aspect, this patent application provides a radio access network slice generation method. The method includes: receiving, by a gateway, a radio access network slice access request message sent by a radio access network; and sending, by the gateway, a radio access network slice access response message to the radio access network. The radio access network slice access request message includes information about a service type, and the radio access network slice access response message is used to indicate that the gateway allows access of the radio access network slice.

With reference to the third aspect, in a first possible implementation of the third aspect, the radio access network slice access response message includes context information of the gateway.

According to a fourth aspect, this patent application provides a radio access network. The radio access network includes a transceiver, a memory, and a processor. The memory is configured to store an instruction. The processor is separately connected to the memory and the transceiver, and is configured to execute the instruction to perform the following steps when executing the instruction: receiving, by using the transceiver, a radio access network slice generation request message sent by a slice manager; and generating a radio access network slice. The radio access network slice generation request message includes information about a service type, and a protocol stack corresponding to the service type is configured for the radio access network slice.

With reference to the fourth aspect, in a first possible implementation of the fourth aspect, when executing the instruction, the processor further performs the following steps: receiving, by using the transceiver, a trigger measurement control message sent by the slice manager; and sending a measurement report message to the slice manager by using the transceiver. The trigger measurement control message includes a trigger condition, the measurement report message includes the service type, and the service type meets the trigger condition.

With reference to the fourth aspect or the first possible implementation of the fourth aspect, in a second possible implementation of the fourth aspect, the radio access network slice generation request message further includes information about a quality of service requirement. That the processor performs the step of generating a radio access network slice includes: when the protocol stack is configured for the radio access network slice and an available resource of the radio access network meets the quality of service requirement, the processor performs the following step: generating the radio access network slice.

With reference to any one of the fourth aspect, or the foregoing possible implementations of the fourth aspect, in a third possible implementation of the fourth aspect, when executing the instruction, the processor further performs the following step: sending system update information to a terminal device by using the transceiver, where the system update information includes the service type.

With reference to any one of the fourth aspect, or the foregoing possible implementations of the fourth aspect, in a fourth possible implementation of the fourth aspect, when executing the instruction, the processor further performs the following steps: sending a radio access network slice access request message to a gateway by using the transceiver; and receiving, by using the transceiver, a radio access network slice access response message sent by the gateway. The radio access network slice access request message includes the service type. The radio access network slice access response message is used to indicate that access of the radio access network slice is allowed.

With reference to any one of the fourth aspect, or the foregoing possible implementations of the fourth aspect, in a fifth possible implementation of the fourth aspect, the radio access network slice generation request message further includes information about a radio access network slice establishment and retention priority.

With reference to any one of the foregoing possible implementations of the fourth aspect, in a sixth possible implementation of the fourth aspect, the radio access network slice generation request message further includes identification information of the gateway.

With reference to any one of the fourth aspect, or the foregoing possible implementations of the fourth aspect, in a seventh possible implementation of the fourth aspect, the radio access network slice generation request message further includes information about the protocol stack.

With reference to any one of the fourth aspect, or the foregoing possible implementations of the fourth aspect, in an eighth possible implementation of the fourth aspect, when executing the instruction, the processor further performs the following step: sending a radio access network slice generation response message to the slice manager by using the transceiver.

According to a fifth aspect, this patent application provides a slice manager. The slice manager includes a transceiver, a memory, and a processor. The memory is configured to store an instruction. The processor is separately connected to the memory and the transceiver, and is configured to execute the instruction to perform the following steps when executing the instruction: sending a radio access network slice generation request message to a radio access network by using the transceiver; and receiving, by using the transceiver, a radio access network slice generation response message sent by the radio access network. The radio access network slice generation request message includes information about a service type, and the radio access network slice generation response message is used to indicate that the radio access network generates a radio access network slice. A protocol stack corresponding to the service type is configured for the radio access network slice.

With reference to the fifth aspect, in a first possible implementation of the fifth aspect, when executing the instruction, the processor further performs the following steps: sending a trigger measurement control message to the radio access network by using the transceiver; and receiving a measurement report message sent by the radio access network. The trigger measurement control message includes a trigger condition. The measurement report message includes the service type, and the service type meets the trigger condition.

With reference to the fifth aspect or the first possible implementation of the fifth aspect, in a second possible implementation of the fifth aspect, the radio access network slice generation request message further includes information about a quality of service requirement.

With reference to any one of the fifth aspect, or the foregoing possible implementations of the fifth aspect, in a third possible implementation of the fifth aspect, the radio access network slice generation request message further includes identification information of a gateway.

With reference to any one of the fifth aspect, or the foregoing possible implementations of the fifth aspect, in a fourth possible implementation of the fifth aspect, the radio access network slice generation request message further includes information about the protocol stack.

According to a sixth aspect, this patent application provides a gateway. The gateway includes a transceiver, a memory, and a processor. The memory is configured to store an instruction. The processor is separately connected to the memory and the transceiver, and is configured to execute the instruction to perform the following steps when executing the instruction: receiving, by using the transceiver, a radio access network slice access request message sent by a radio access network; and sending a radio access network slice access response message to the radio access network by using the transceiver. The radio access network slice access request message includes information about a service type. The radio access network slice access response message is used to indicate that the gateway allows access of the radio access network slice.

With reference to the sixth aspect, in a first possible implementation of the sixth aspect, the radio access network slice access response message includes context information of the gateway.

According to a seventh aspect, this patent application further provides a network system, and the network system includes the radio access network in the fourth aspect and the slice manager in the fifth aspect. The network system may further include the gateway in the sixth aspect.

According to an eighth aspect, this patent application provides a radio access network. The radio access network includes a receiving unit and a processing unit. The receiving unit is configured to receive a radio access network slice generation request message sent by a slice manager. The processing unit is configured to generate the radio access network slice. The radio access network slice generation request message includes information about a service type. A protocol stack corresponding to the service type is configured for the radio access network slice.

With reference to the eighth aspect, in a first possible implementation of the eighth aspect, the radio access network further includes a transmitting unit. The receiving unit is further configured to: before receiving the radio access network slice generation request message sent by the slice manager, receive a trigger measurement control message sent by the slice manager. The transmitting unit is configured to send a measurement report message to the slice manager. The trigger measurement control message includes a trigger condition. The measurement report message includes the service type, and the service type meets the trigger condition.

With reference to the first possible implementation of the eighth aspect, in a second possible implementation of the eighth aspect, the radio access network slice generation request message further includes information about a quality of service requirement. The processing unit is further configured to: when the protocol stack is configured for the radio access network slice and an available resource of the radio access network meets the quality of service requirement, generate the radio access network slice.

With reference to any one of the eighth aspect, or the foregoing possible implementations of the eighth aspect, in a third possible implementation of the eighth aspect, the transmitting unit is further configured to send system update information to a terminal device. The system update information includes the service type.

With reference to any one of the eighth aspect, or the foregoing possible implementations of the eighth aspect, in a fourth possible implementation of the eighth aspect, the transmitting unit is further configured to: before the processing unit generates the radio access network slice, send a radio access network slice access request message to a gateway. The receiving unit is further configured to receive a radio access network slice access response message sent by the gateway. The radio access network slice access request message includes the service type, and the radio access network slice access response message is used to indicate that the gateway allows access of the radio access network slice.

With reference to any one of the eighth aspect, or the foregoing possible implementations of the eighth aspect, in a fifth possible implementation of the eighth aspect, the radio access network slice generation request message further includes information about a radio access network slice establishment and retention priority.

With reference to any one of the first to the fifth possible implementations of the eighth aspect, in a sixth possible implementation of the eighth aspect, the radio access network slice generation request message further includes identification information of the gateway.

With reference to any one of the eighth aspect, or the foregoing possible implementations of the eighth aspect, in a seventh possible implementation of the eighth aspect, the radio access network slice generation request message further includes information about the protocol stack.

With reference to any one of the eighth aspect, or the foregoing possible implementations of the eighth aspect, in an eighth possible implementation of the eighth aspect, the transmitting unit is further configured to: after the radio access network slice is generated, send a radio access network slice generation response message to the slice manager. The radio access network slice generation response message is used to indicate that the radio access network generates the radio access network slice.

According to a ninth aspect, this patent application provides a slice manager. The slice manager includes a transmitting unit and a receiving unit. The transmitting unit is configured to send a radio access network slice generation request message to a radio access network. The receiving unit is configured to receive a radio access network slice generation response message sent by the radio access network. The radio access network slice generation request message includes information about a service type. The radio access network slice generation response message is used to indicate that the radio access network generates a radio access network slice. A protocol stack corresponding to the service type is configured for the radio access network slice.

With reference to the ninth aspect, in a first possible implementation of the ninth aspect, the transmitting unit is further configured to: before sending the radio access network slice generation request message to the radio access network, send a trigger measurement control message to the radio access network. The receiving unit is further configured to receive a measurement report message sent by the radio access network. The trigger measurement control message includes a trigger condition. The measurement report message includes the service type, and the service type meets the trigger condition.

With reference to the ninth aspect or the first possible implementation of the ninth aspect, in a second possible implementation of the ninth aspect, the radio access network slice generation request message further includes information about a quality of service requirement. That the radio access network generates the radio access network slice includes: when the protocol stack is configured for the radio access network slice and an available resource of the radio access network meets the quality of service requirement, generating, by the radio access network, the radio access network slice.

With reference to any one of the ninth aspect, or the foregoing possible implementations of the ninth aspect, in a third possible implementation of the ninth aspect, the radio access network slice generation request message further includes identification information of a gateway.

With reference to any one of the ninth aspect, or the foregoing possible implementations of the ninth aspect, in a fourth possible implementation of the ninth aspect, the radio access network slice generation request message further includes information about the protocol stack.

According to a tenth aspect, this patent application provides a gateway. The gateway includes a receiving unit and a transmitting unit. The receiving unit is configured to receive a radio access network slice access request message sent by a radio access network. The transmitting unit is configured to send a radio access network slice access response message to the radio access network. The radio access network slice access request message includes information about a service type, and the radio access network slice access response message is used to indicate that the gateway allows access of the radio access network slice.

With reference to the tenth aspect, in a first possible implementation of the tenth aspect, the radio access network slice access response message includes context information of the gateway.

According to an eleventh aspect, this patent application further provides a network system, and the network system includes the radio access network in the eighth aspect and the slice manager in the ninth aspect. The network system may further include the gateway in the tenth aspect.

According to the radio access network slice generation method, the radio access network, and the slice manager in this patent application, radio access networks may be quickly deployed for different types of services.

BRIEF DESCRIPTION OF DRAWINGS

To describe the technical solutions in the embodiments of this patent application more clearly, the following briefly describes the accompanying drawings required for describing the embodiments of this patent application. Apparently, the accompanying drawings in the following description show merely some embodiments of this patent application, and a person of ordinary skill in the art may derive other drawings from these accompanying drawings without creative efforts.

DESCRIPTION OF EMBODIMENTS

The following describes the technical solutions in the embodiments of this patent application with reference to the accompanying drawings in the embodiments of this patent application. Apparently, the described embodiments are merely some but not all of the embodiments of this patent application. All other embodiments obtained by a person of ordinary skill in the art based on the embodiments of this patent application without creative efforts shall fall within the protection scope of this patent application.

A terminal device in this patent application may also be referred to as a subscriber unit, a subscriber station, a mobile station, a mobile console, a remote station, a remote terminal, a mobile device, a user terminal device, a wireless communications device, a user agent, a user apparatus, or user equipment (User Equipment, UE). The terminal device may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, or another processing device connected to a wireless modem.

In this patent application, a radio access network (Radio Access Network, RAN) may be configured to communicate with a moving terminal device, and the radio access network may include a base station. The base station may be a base transceiver station (Base Transceiver Station, BTS) in a Global System for Mobile Communications (Global System for Mobile Communications, GSM) or Code Division Multiple Access (Code Division Multiple Access, CDMA); or may be a NodeB (NodeB, NB) in Wideband Code Division Multiple Access (Wideband Code Division Multiple Access, WCDMA); or may be an evolved NodeB (Evolved Node B, eNB) in Long Term Evolution (Long Term Evolution, LTE), a relay station or an access point, a base station device in a future communications network, or the like.

Figure 1:
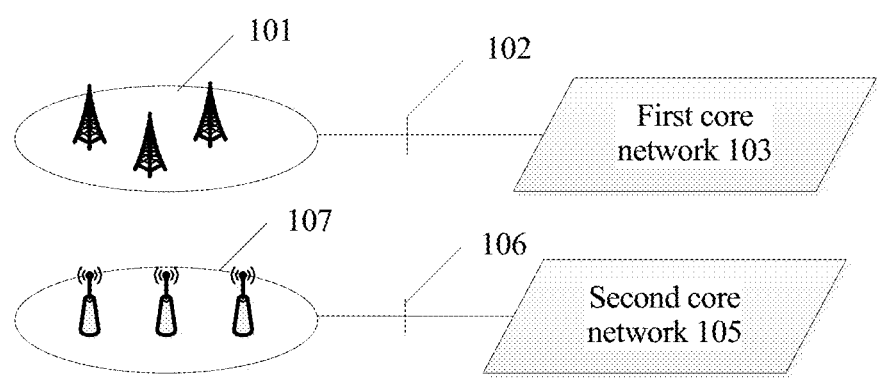
FIG. 1 is a schematic architectural diagram of a network system according to an embodiment of this patent application.

FIG. 1 is a schematic architectural diagram of a network system according to an embodiment of this patent application. As shown in FIG. 1, the network system includes a first core network 103, a first RAN 101, a first interface 102, a second core network 105, a second interface 106, and a second RAN 107. The first core network 103 and the first RAN 101 are connected by using the first interface 102, to jointly serve a first service. The second core network 105 and the second RAN 107 are connected by using the second interface 106, to jointly serve a second service.

For example, the first service may be an MBB service, the first interface 102 is correspondingly an S1 interface, and the first RAN 101 may include an evolved NodeB in existing LTE. The second service may be an NB-IoT service, the second interface 106 is correspondingly an S1-lite interface, and the second RAN 107 may include a new NB-IoT base station. Compared with the S1 interface, the S1-lite interface is simplified. For example, on a control plane, the S1-lite interface only needs to support a simplified control procedure, and on a user plane, the S1-lite interface does not need to support establishment of a dedicated data bearer, either.

In the architecture shown in FIG. 1, hardware needs to be repeatedly deployed to meet different service types. For example, a RAN and a core network are repeatedly deployed. Massive hardware deployment increases device and operating expenses. In addition, it is very time-consuming, and is not conducive to rapid deployment of a new service.

Figure 2:
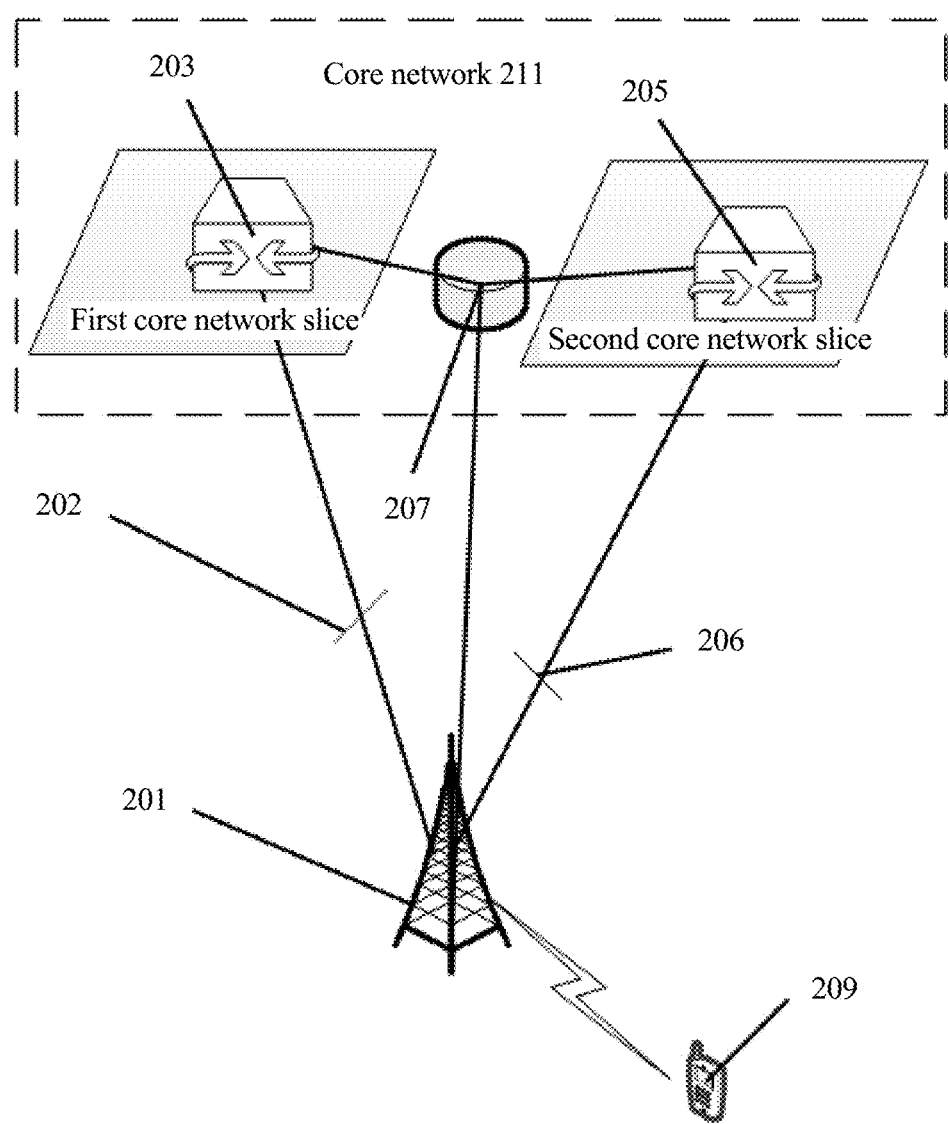
FIG. 2 is a schematic architectural diagram of a network system according to another embodiment of this patent application.

FIG. 2 is a schematic architectural diagram of a network system according to another embodiment of this patent application. As shown in FIG. 2, the network system includes a RAN 201 and a core network 211. A terminal device 209 is connected to the RAN 201 in a radio access manner. The core network 211 includes a first gateway 203, a second gateway 205, and a slice manager 207. The slice manager 207 is separately connected to the first gateway 203 and the second gateway 205. The core network may provide functions such as authentication, routing, and charging for the terminal device connected to the RAN 201.

In a case, the core network 211 may include a first core network slice and a second core network slice. The first core network slice serves a first service. The second core network slice serves a second service. The first service may be a mobile broadband (Mobile Broadband, MBB) service. The second service may be an NB-IoT service. The service types are merely examples for description, and do not constitute a limitation. A core network slice includes a series of network functions and resources required for implementing these functions. These network functions may provide core network functions such as security verification and authentication that are required by corresponding services. The first gateway 203 corresponds to the first core network slice, and the second gateway 205 corresponds to the second core network slice. The RAN 201 may be connected to the first gateway 203 by using a first interface 202, and the first interface 202 may be an S1 interface. The RAN 201 is connected to the second gateway 205 by using a second interface 206, and the second interface 206 may be an S1-lite interface.

The slice manager 207 is connected to the RAN 201, and is configured to control the RAN 201 to generate a slice. For example, the slice manager 207 may control the RAN 201 to generate a first RAN slice, to provide the first service for the terminal device. The generated first RAN slice is connected to the first gateway 203 by using the first interface 202. If the first service is an MBB service, correspondingly, the first interface 202 is an S1 interface. The slice manager 207 may further control the RAN 201 to generate a second RAN slice, to provide the second service for the terminal device. The generated second RAN slice is connected to the second gateway 205 by using the second interface 206. If the second service is an NB-IoT service, correspondingly, the second interface 206 is an S1-lite interface. Each RAN slice may include at least one processing unit that can be shared, and a corresponding protocol stack function may be assigned to the processing unit, to provide a customized service for a service.

The slice manager 207 may also have another name such as a network manager. Any network device that is configured to control the RAN 201 to generate a slice may be considered as a slice manager. The slice manager 207 is separately connected to the first gateway 203 and the second gateway 205 for information exchange. The slice manager 207 may obtain, by using the first gateway 203, information about the core network slice corresponding to the first gateway 203. The slice manager 207 may obtain, by using the second gateway 205, information about the core network slice corresponding to the second gateway 205.

Figure 3:
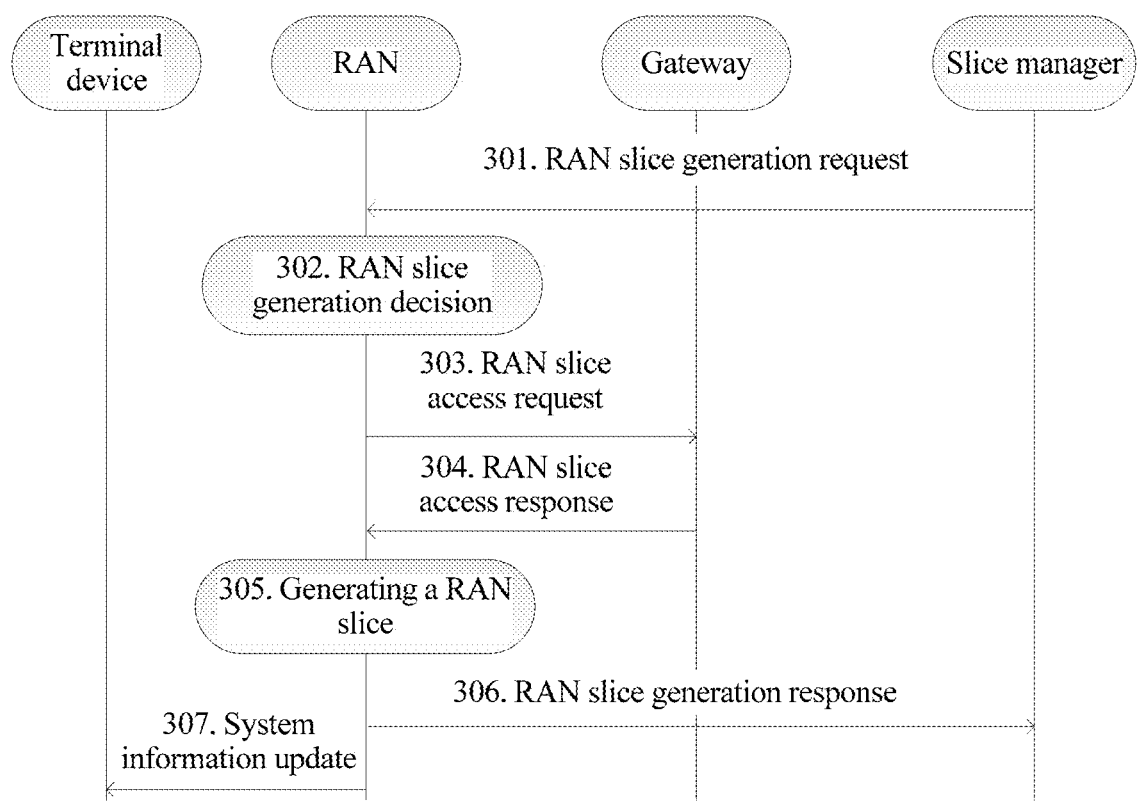
FIG. 3 is a schematic interaction diagram of a radio access network slice generation method according to another embodiment of this patent application.

FIG. 3 is a schematic interaction diagram of a radio access network slice generation method according to another embodiment of this patent application. The method in this embodiment may be applied to a scenario in which a network needs to generate a new RAN slice. Alternatively, the method is applied to a scenario in which generation of a RAN slice is periodically triggered. As shown in FIG. 3, the method includes the following steps:

301. A slice manager (slice manager) sends a RAN slice generation request message to a radio access network (RAN). The RAN receives the RAN slice generation request message. The message includes information about a service type. The RAN slice generation request message is used to indicate that a RAN slice corresponding to the service type needs to be generated. In this embodiment, the message may further include information about a protocol stack, and the protocol stack corresponds to the service type. Step 301 may be regularly triggered, or may be triggered during initial configuration of the RAN.

302. The RAN makes a RAN slice generation decision. A specific decision process is further described in detail below. If the RAN decides to generate a new slice, proceed to the following steps.

303. The RAN sends a RAN slice access request (RAN slice access request) message to a gateway. The gateway receives the RAN slice access request message. The message includes the information about the service type, and is used by the gateway to determine whether to accept access of the RAN slice. The message may further include context information of the RAN, for example, an E-UTRAN cell global identifier (E-UTRAN Cell Global Identifier, ECGI) and a tracking area code.

304. After receiving the RAN slice access request message, the gateway determines whether to allow access of a RAN slice. For example, the gateway may determine, based on a service type included in the RAN slice access request message, whether to allow the access of the RAN slice. If the service type cannot be supported by a core network slice corresponding to the gateway, the gateway rejects access of the RAN slice; and if the service type can be supported by the core network corresponding to the gateway, the gateway allows the access of the RAN. The gateway sends RAN slice access response message to the RAN, and the RAN receives the RAN slice access response message. The slice access response message may include context information of the gateway. The context information of the gateway may include access capability information, and the access capability information is used by the RAN to select a gateway. The RAN preferentially selects a gateway with a high access capability to access. The context information of the gateway may further include identification information of the gateway, for example, a gateway ID.

305. After receiving a RAN slice access response message, the RAN generates the RAN slice. Specifically, there are a plurality of implementations for generating RAN slice. For example, the RAN includes a plurality of sub-function modules. The RAN differently combines the sub-function modules based on a protocol stack type corresponding to the RAN slice, to constitute a protocol stack processing module corresponding to the protocol stack, and logically generate different RAN slices. The protocol stack corresponding to the service type is configured for the generated RAN slices.

306. After generating the RAN slice, the RAN sends a RAN slice generation response message to the slice manager. The RAN slice generation response message is used to indicate that the RAN generates a RAN slice corresponding to the service type. The message may further include ID information of the gateway, so that the slice manager can know a gateway currently accessed by the RAN slice and a service type supported by a core network slice corresponding to the gateway.

307. The RAN sends system update information to a terminal device, and the terminal device receives the system update information. The information includes a service type, and is used to indicate a service type supported by the RAN.

There is no sequence between step 306 and step 307. Based on a requirement, step 306 may be performed before step 307, or step 307 may be performed before step 306, or step 306 and step 307 may be performed at the same time.

In step 301, the RAN slice generation request message may further include identification information (for example, ID information) of the gateway. If the RAN slice generation request message includes the ID information of the gateway, the RAN may send the RAN slice access request message to the gateway in step 303. If the RAN slice generation request message does not include the ID information of the gateway, the RAN needs to send the request information to all gateways other than the currently connected gateway. When the RAN slice generation request message includes gateway information, an amount of transmitted signaling may be reduced.

In step 301, the RAN slice generation request message may further include information about a quality of service (Quality of Service, QoS) requirement. The information about the QoS is used to indicate a QoS requirement corresponding to the service type, so that the RAN calculates a resource that meets the QoS when the protocol stack is configured for the RAN slice. The RAN may determine, based on a resource usage status, whether to establish the RAN slice. Only when the protocol stack is configured for the radio access network slice and an available resource of the radio access network meets the quality of service requirement, the RAN generates the RAN slice. The available resource of the RAN may include an idle resource of the RAN.

In step 301, the RAN slice generation request message may further include information about a RAN slice establishment and retention priority (RAN Slice Establishment and Retention Priority, RERP). A function of the RERP includes the following: The RAN decides to accept or reject a specific RAN slice generation request in a resource-constrained case, and requests are accepted in descending order of priorities. For example, if the RAN receives a plurality of RAN slice generation requests at the same time, the RAN first accepts a RAN slice generation request with a highest priority, and first allocates a resource to a RAN slice with a highest priority. The function of the RERP further includes the following: The RAN releases a specific RAN slice in a resource-constrained case, and slices are released in ascending order of priorities. For example, if resources of the RAN are constrained, a RAN slice with a lowest priority is released. The RERP may preferentially ensure quality of service of a service with a higher priority, ensure high quality of service of a user, and maximize network benefits in a resource-constrained case.

Figure 4:
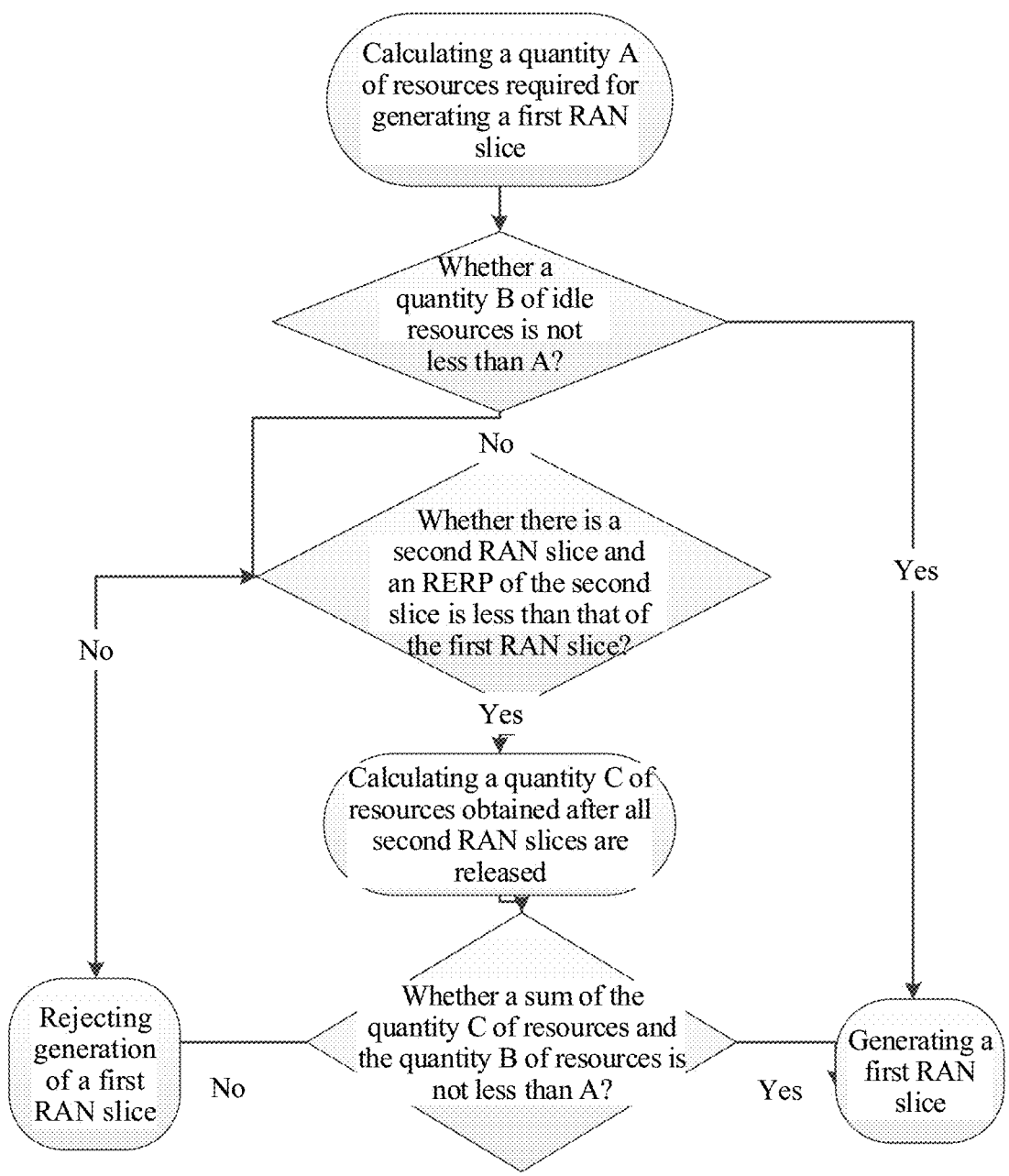
FIG. 4 is a schematic flowchart of a radio access network slice generation decision according to another embodiment of this patent application.

FIG. 4 is a schematic flowchart of a RAN slice generation decision according to another embodiment of this patent application. As shown in FIG. 4, a specific process may be as follows: A RAN first calculates, based on information about QoS and information about a protocol stack type in a RAN slice generation request, a quantity A of resources required for generating a first RAN slice. If a quantity B of idle resources in the RAN is not less than the quantity A of resources, the RAN decides to generate a new first RAN slice. If the quantity B of resources is less than the quantity A of resources, the RAN further determines whether at least one second RAN slice whose RERP is less than an RERP of the first RAN slice exists in current RAN slices in the RAN. If the at least one second RAN slice exists, and a sum of a quantity C of resources obtained by releasing the second RAN slice and the quantity B of idle resources is not less than the quantity A of resources, the RAN decides to generate a new first RAN slice. If the at least one second RAN slice does not exist, or the sum of the quantity C of resources obtained by releasing the second RAN slice and the quantity B of idle resources is less than the quantity A of resources, the RAN decides not to generate a new first RAN slice. The foregoing RAN slice generation decision uses a quantity of resources as a criterion. In this case, an available resource of the RAN may include an idle resource and a resource in the RAN that may be released.

It should be noted that the RAN slice generation decision may further use another criterion such as energy consumption. For example, the RAN calculates, based on the information about the QoS and the protocol stack type in the RAN slice generation request, newly increased energy consumption X required for generating the first RAN slice. If the newly increased energy consumption X is less than a specified energy consumption upper limit Y, and the energy consumption Y may be set by a slice manager, the RAN decides to generate a first RAN slice; or if the newly increased energy consumption X is not less than a specified energy consumption upper limit Y, the RAN rejects generation of a first RAN slice. The RAN slice generation decision may further use an operating expense (Operating Expense, OPEX) as a criterion.

In this patent application, the service type may include a service type, for example, an MBB service, an NB-IoT service, or another service. The service type may also include an operator type and a service type. In different service types, if service types are different, corresponding RAN slices use different protocol stack types. The operator type may reflect isolation. In this case, the service types may be different, or may be the same. An operator may be a virtual network operator. For example, Tencent may require that a dedicated RAN slice is generated to provide a service for QQ Video, and Apple may also require that a dedicated RAN slice is generated to provide a service for FaceTime. The two service types are the same, but the two operator types are different.

The RAN slice may implement the functions of the radio access network, and provide a communication service for a specific service. One RAN may generate one or more RAN slices. The protocol stack corresponding to the service type is configured for the RAN slice. Different RAN slices may have different protocol stack processing procedures. The RAN is a physical entity, and the RAN slice may be a logical concept. A RAN slice for which a specific protocol stack is configured may use a specific resource. The resource may include a processing resource and/or a transmission resource. The processing resource may be represented in a form of a processor, and the transmission resource may be represented in a form of an air interface time-frequency resource.

The protocol stack is a sum of protocols at layers in the network. The protocol stack configured for the RAN slice may include at least one of a physical (PHY) layer, a Media Access Control (Media Access Control, MAC) layer, a Radio Link Control (Radio Link Control, RLC) layer, or a Packet Data Convergence Protocol (Packet Data Convergence Protocol, PDCP) layer.

For example, a first protocol stack may be configured for a first RAN slice corresponding to the mobile broadband (Mobile Broadband, MBB) service. Correspondingly, the first RAN slice may include a first protocol stack processing module, and the first protocol stack processing module includes a PDCP sub-function module, an RLC sub-function module, a MAC sub-function module, and a PHY sub-function module. The PDCP sub-function module may be configured to perform header compression and decompression and security control of data, and the like. The RLC sub-function module may be configured to perform data segmentation and concatenation. The MAC sub-function module may be configured to: perform scheduling and multiplexing/demultiplexing, and support a multicast service. The PHY sub-function module may be configured to perform channel coding/decoding and modulation/demodulation.

A second protocol stack may be configured for a second RAN slice corresponding to the NB-IoT service. Correspondingly, the second RAN slice may include a second protocol stack processing module, and the second protocol stack processing module includes a MAC sub-function module and a PHY sub-function module. The MAC sub-function module and the PHY sub-function module in the second protocol stack processing module may be different from the MAC sub-function module and the PHY sub-function module in the first protocol stack processing module. For example, the MAC sub-function module in the second protocol stack processing module may not include multicast function.

Figure 5:
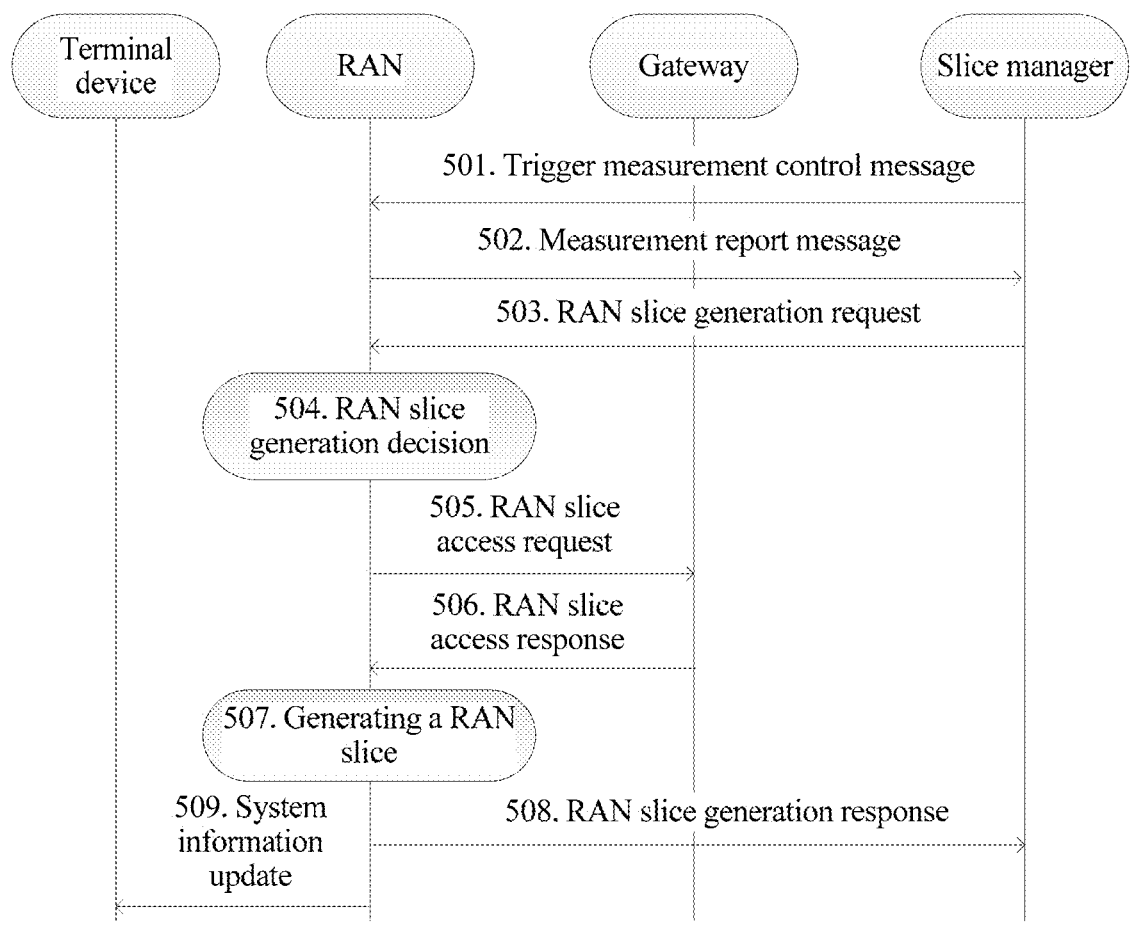
FIG. 5 is a schematic interaction diagram of a radio access network slice generation method according to another embodiment of this patent application.

FIG. 5 is a schematic interaction diagram of a radio access network slice generation method according to another embodiment of this patent application. As shown in FIG. 5, the method includes the following steps:

501. A slice manager sends a trigger measurement control message to a radio access network, and the RAN receives the trigger measurement control message. The trigger measurement control message carries a trigger condition. The trigger condition is used to instruct the RAN to send a measurement report to the slice manager when the trigger condition is met.

502. After receiving the trigger measurement control message, the RAN sends a RAN slice measurement report message to the slice manager if the trigger condition is met, where the message includes a service type. The service type meets the trigger condition.

Steps 503 to 509 are basically the same as steps 301 to 307.

In the trigger measurement control message, different service types may have different trigger conditions. For example, a trigger condition of an MBB service may be that performance of an MBB service connected to a default slice is lower than a specified threshold. The performance may be a throughput and/or a latency. A trigger condition of an NB-IoT service may be that a quantity of machine type communication (machine type communication, MTC) terminal devices connected to a default slice reaches a specified threshold.

In this embodiment, the RAN may pre-store a default RAN slice. The default RAN slice may provide services for a plurality of service types to some extent. When a terminal device accesses the RAN, if a service type of the terminal device corresponds to no dedicated RAN slice and a default slice supports the service type, the terminal device is first served in the default slice. After a dedicated RAN slice corresponding to the service type of the terminal device is generated, the terminal device is handed over to the dedicated RAN slice. There may be a plurality of default slices that may be specifically established by using the embodiment shown in FIG. 3. When the default slice is established by using the embodiment shown in FIG. 3, a service type in a RAN slice generation request message only needs to be set to a service type of the default slice.

A RAN slice is established in an event trigger scenario in this embodiment. In steps 501 and 502, the RAN may automatically trigger establishment of a slice, for example, based on a resource usage status and a real-time load status. Resource utilization is improved because of real-time performance.

Figure 6:
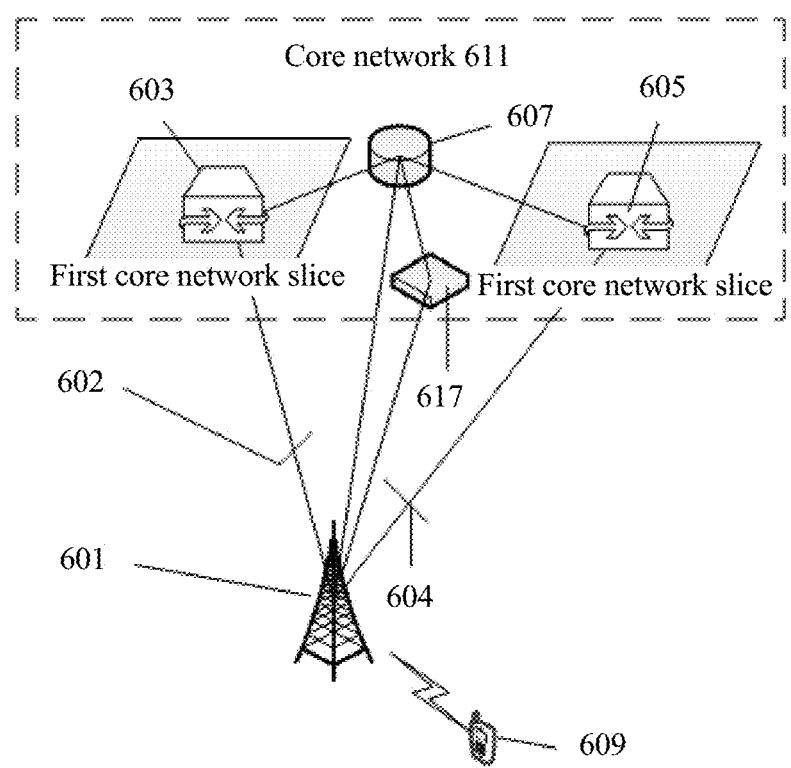
FIG. 6 is a schematic architectural diagram of a network according to another embodiment of this patent application.

FIG. 6 is a schematic structural diagram of a network system according to another embodiment of this patent application. As shown in FIG. 6, the network system includes a RAN 601 and a core network 611. A terminal device 609 is connected to the RAN 601 in a radio access manner. The core network 611 includes a first gateway 603, a second gateway 605, a slice manager 607, and a software defined protocol controller (software defined protocol controller, SDPC) 617. The slice manager 607 is separately connected to the first gateway 603 and the second gateway 605. The core network may provide functions such as authentication, routing, and charging for the terminal device connected to the RAN 601.

In a case, the core network 611 may include a first core network slice and a second core network slice. The first core network slice serves a first service. The second core network slice serves a second service. The first gateway 603 corresponds to the first core network slice, and the second gateway 605 corresponds to the second core network slice. The RAN 601 may be connected to the first gateway 603 by using a first interface 602. The RAN 601 is connected to the second gateway 605 by using a second interface 604.

The slice manager 607 is connected to the RAN 601, and is configured to control the RAN 601 to generate a slice. The SDPC 617 is configured to configure protocol stacks of different RAN slices. The SDPC 617 stores a correspondence between a service type and a protocol stack of a RAN slice, and the SDPC 617 may feed back, to the RAN based on received information about a service type, a protocol stack type corresponding to the information about the service type. For a similarity between FIG. 6 and FIG. 2, refer to the description of FIG. 2. Details are not described herein again.

Figure 7:
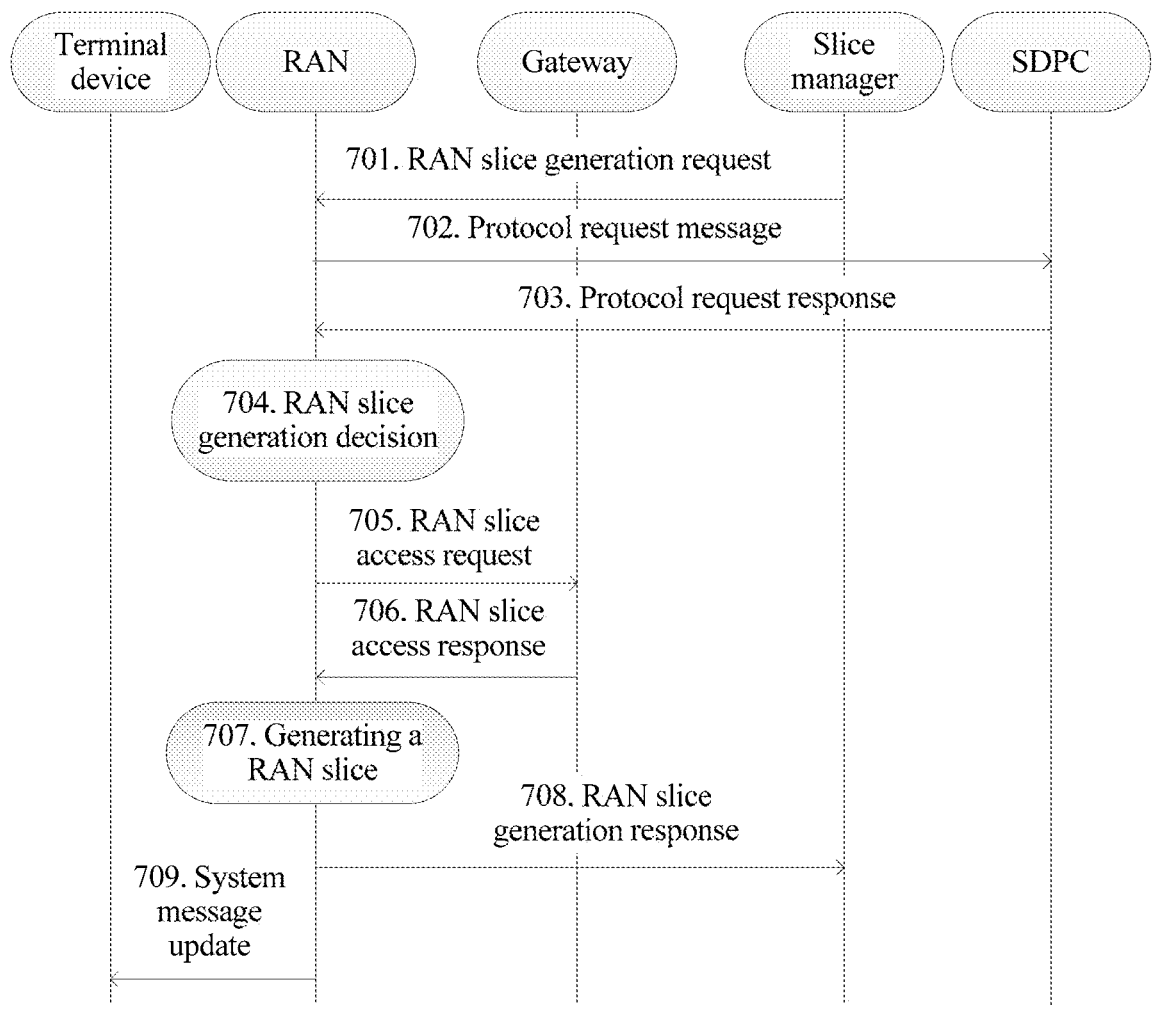
FIG. 7 is a schematic interaction diagram of a radio access network slice generation method according to another embodiment of this patent application.

FIG. 7 is a schematic interaction diagram of a radio access network slice generation method according to another embodiment of this patent application. As shown in FIG. 7, the method includes the following steps:

701. A slice manager sends a RAN slice generation request message to a RAN. The RAN receives the RAN slice generation request message. The message includes information about a service type. The information about the service type is used to indicate that a RAN slice corresponding to the service type needs to be generated.

702. After receiving the RAN slice generation request message, the RAN sends a protocol request message to an SDPC. The SDPC receives the protocol request message. The protocol request message includes the information about the service type.

703. After receiving the protocol request message, the SDPC determines, based on information about a service type in the message, a protocol stack type corresponding to the service type. The SDPC may determine, based on a correspondence between a service type and a protocol stack of a RAN slice, the protocol stack type corresponding to the service type. The SDPC sends a protocol stack request response message to the RAN. The RAN receives the protocol stack request response message. The message includes the protocol stack type.

Steps 704 to 709 are basically the same as steps 302 to 307.

In this embodiment, the RAN slice generation request message does not need to carry the protocol stack type, and the protocol stack type corresponding to the service type is obtained in steps 702 and 703.

Figure 8:
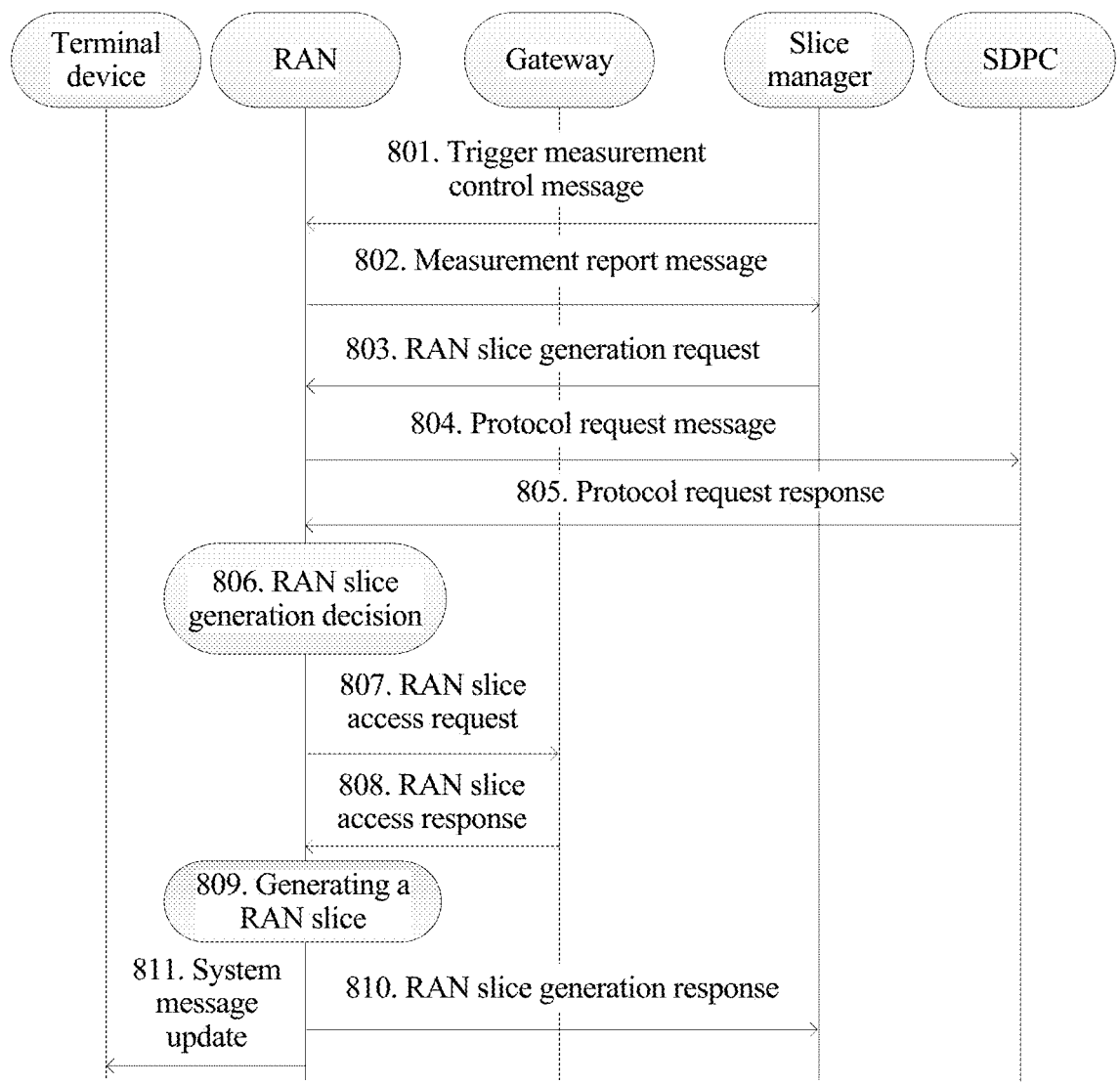
FIG. 8 is a schematic interaction diagram of a radio access network slice generation method according to another embodiment of this patent application.

FIG. 8 is a schematic interaction diagram of a radio access network slice generation method according to another embodiment of this patent application. As shown in FIG. 8, the method includes the following steps:

Step 801 is basically the same as step 501.

Step 802 is basically the same as step 502.

Steps 803 to 811 are basically the same as steps 701 to 709.

The solutions provided in the embodiments of the present invention are mainly described above from a perspective of interaction between network elements. It may be understood that, to implement the foregoing functions, each network element includes a corresponding hardware structure and/or software module for implementing each function. A person skilled in the art should be readily aware that, with reference to the disclosed embodiments in this specification, this patent application can be implemented in a form of hardware or in a form of a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of this patent application.

This patent application further provides an apparatus embodiment for implementing the steps and the methods in the foregoing method embodiments. It should be noted that the apparatus embodiment may be used together with the foregoing method, or may be independently used.

Figure 9:
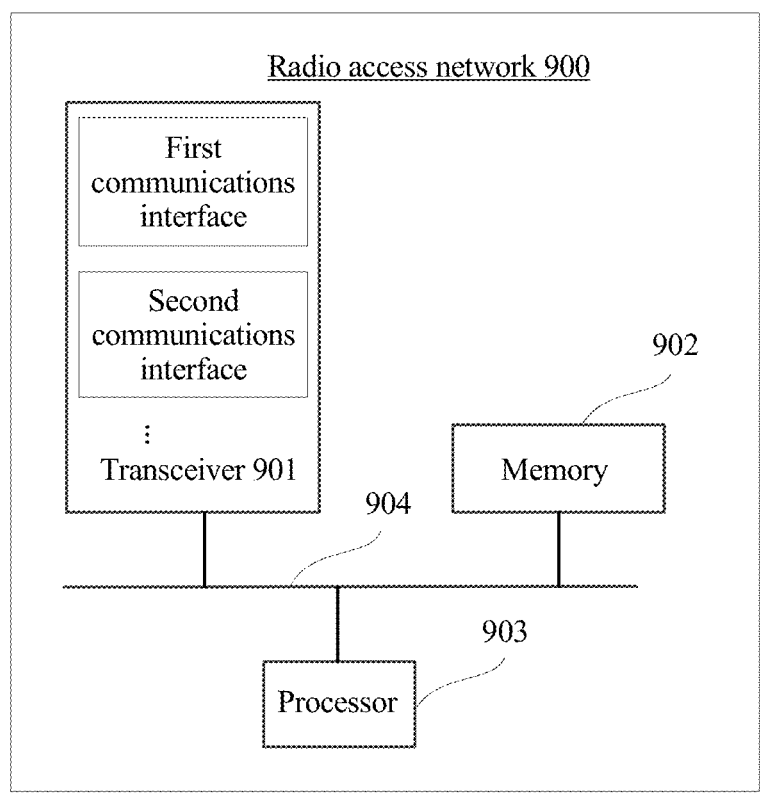
FIG. 9 is a schematic structural diagram of a radio access network according to another embodiment of this patent application.

FIG. 9 is a possible schematic structural diagram of a radio access network used in the foregoing embodiments. As shown in FIG. 9, the radio access network 900 includes a transceiver 901, a memory 902, and a processor 903. The memory 902 is configured to store an instruction. The processor 903 is separately connected to the memory 902 and the transceiver 901, and is configured to execute the instruction to perform the following steps when executing the instruction: receiving, by using the transceiver 901, a radio access network slice generation request message sent by a slice manager; and generating a radio access network slice. The radio access network slice generation request message includes information about a service type, and a protocol stack corresponding to the service type is configured for the radio access network slice.

Optionally, when executing the instruction, the processor 903 further performs the following steps: receiving, by using the transceiver 901, a trigger measurement control message sent by the slice manager; and sending a measurement report message to the slice manager by using the transceiver 901. The trigger measurement control message includes a trigger condition, the measurement report message includes the service type, and the service type meets the trigger condition.

Optionally, the radio access network slice generation request message further includes information about a quality of service requirement. That the processor 903 performs the step of generating a radio access network slice includes: when the protocol stack is configured for the radio access network slice and an available resource of the radio access network meets the quality of service requirement, the processor 903 performs the following step: generating the radio access network slice.

Optionally, when executing the instruction, the processor 903 further performs the following step: sending system update information to a terminal device by using the transceiver 901, where the system update information includes the service type.

Optionally, when executing the instruction, the processor 903 further performs the following steps: sending a radio access network slice access request message to a gateway by using the transceiver 901; and receiving, by using the transceiver 901, a radio access network slice access response message sent by the gateway. The radio access network slice access request message includes the service type. The radio access network slice access response message is used to indicate that access of the radio access network slice is allowed.

Optionally, when executing the instruction, the processor 903 further performs the following step: sending a radio access network slice generation response message to the slice manager by using the transceiver 901.

Optionally, the transceiver 901 and the memory 902 may be directly connected to the processor 903. Alternatively, as shown in FIG. 9, the transceiver 901 and the memory 902 are connected to a bus 904, and the processor 903 is also connected to the bus 904.

In an embodiment, the transceiver 901 may include a first communications interface, a second communications interface, a third communications interface, and a fourth communications interface (which are not completely shown in the figure). The first communications interface is configured to communicate with a terminal device, and specifically, may receive information from the terminal device and/or send information to the terminal device. Communication between the first communications interface and the terminal device is wireless communication. The second communications interface is configured to communicate with a gateway, and specifically, may receive information from the gateway and/or send information to the gateway. Communication between the second communications interface and the gateway may be wired communication, or may be wireless communication. The third communications interface is configured to communicate with a slice manager, and specifically, may receive information from the slice manager and/or send information to the slice manager. Communication between the third communications interface and the slice manager may be wired communication, or may be wireless communication. The fourth communications interface is configured to communicate with an SDPC, and specifically, may receive information from the SDPC and/or send information to the SDPC. Communication between the fourth communications interface and the SDPC may be wired communication, or may be wireless communication. The first communications interface, the second communications interface, the third communications interface, and the fourth communications interface may be physically independent. Alternatively, the first communications interface, the second communications interface, the third communications interface, and the fourth communications interface may be partially or completely integrated physically. The second communications interface may include a plurality of independent communications interfaces, and all independent communications interfaces may be used by different RAN slices to communicate with corresponding gateways.

Different RAN slices may perform transmission on an air interface by using isolated and mutually orthogonal time-frequency resources. For example, a first RAN slice performs transmission by using frequency domain resource of 10 MHz to 20 MHz, and a second RAN slice performs transmission by using a frequency domain resource of 30 MHz to 40 MHz. Alternatively, different RAN slices share a same frequency domain resource, but are distinguished from each other through scheduling.

Figure 10:
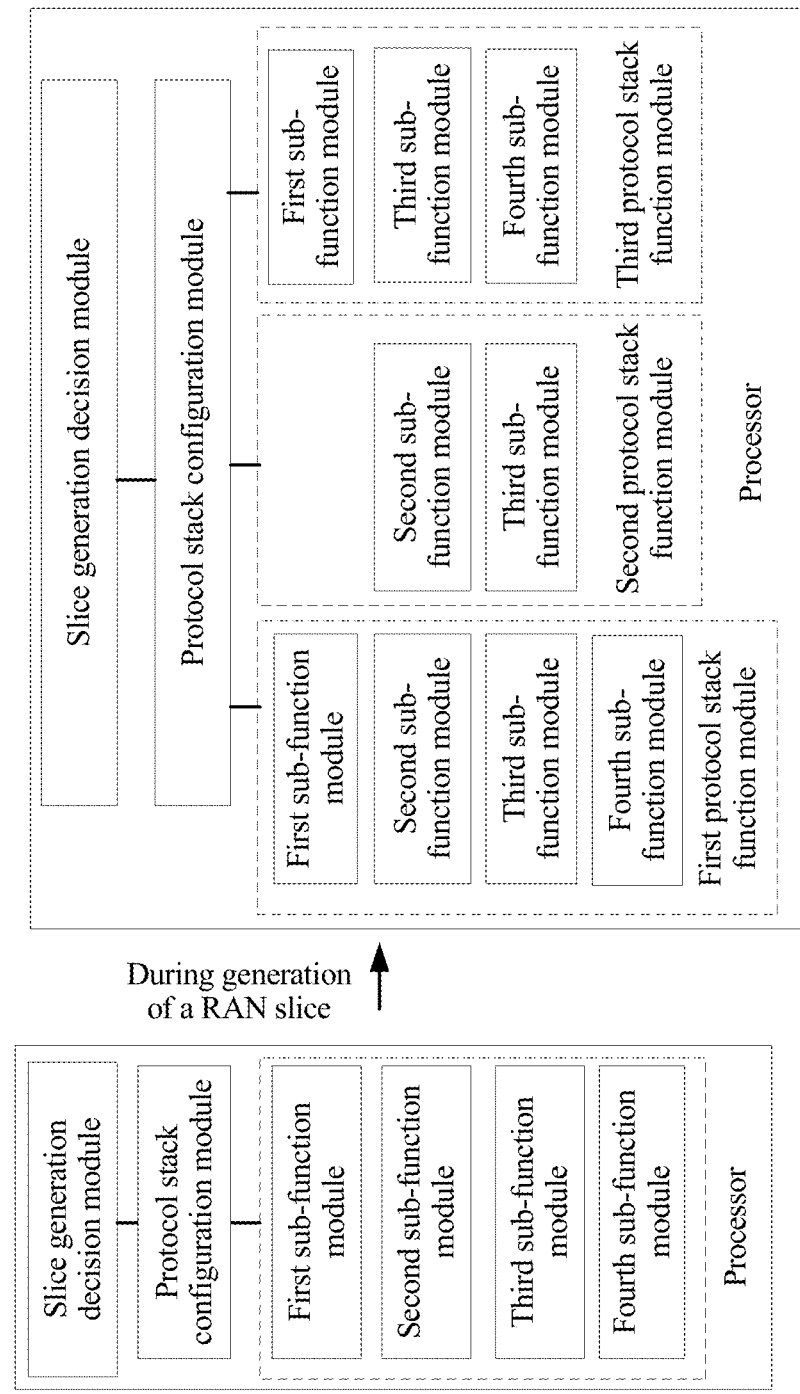
FIG. 10 is a schematic diagram of processing of a processor of a radio access network according to another embodiment of this patent application.

As shown in FIG. 10, the processor 903 may include a slice generation decision module, a protocol stack configuration module, a first sub-function module, a second sub-function module, a third sub-function module, and a fourth sub-function module. There may be one or more first sub-function modules, second sub-function modules, third sub-function modules, and fourth sub-function modules. A case in which there are four sub-function modules is described above by using an example. Quantities of sub-function modules may change. For example, there may be one or more first sub-function modules.

The slice generation decision module is configured to: make a slice generation decision, and notify the protocol stack configuration module when deciding to generate a RAN slice. After receiving the notification, the protocol stack configuration module combines sub-function modules in the RAN based on a protocol stack corresponding to the RAN slice that needs to be generated, to generate a RAN slice corresponding to the protocol stack.

For example, as shown in FIG. 10, when the RAN needs to generate a first RAN slice for which a first protocol stack is configured, the protocol stack configuration module selects a corresponding first sub-function module, second sub-function module, third sub-function module, and fourth sub-function module for combination based on the first protocol stack, to obtain a first protocol stack function module. When the RAN needs to generate a second RAN slice for which a second protocol stack is configured, the protocol stack configuration module selects a corresponding second sub-function module and third sub-function module for combination based on the second protocol stack, to obtain a second protocol stack function module. When the RAN needs to generate a third RAN slice for which a third protocol stack is configured, the protocol stack configuration module selects a corresponding third sub-function module and fourth sub-function module for combination based on the third protocol stack, to obtain a third protocol stack function module. There may be one or more protocol stack function modules in one RAN. In an embodiment, the first sub-function module, the second sub-function module, the third sub-function module, and the fourth sub-function module may be respectively a PDCP sub-function module, an RLC sub-function module, a MAC sub-function module, and a PHY sub-function module.

Figure 11:
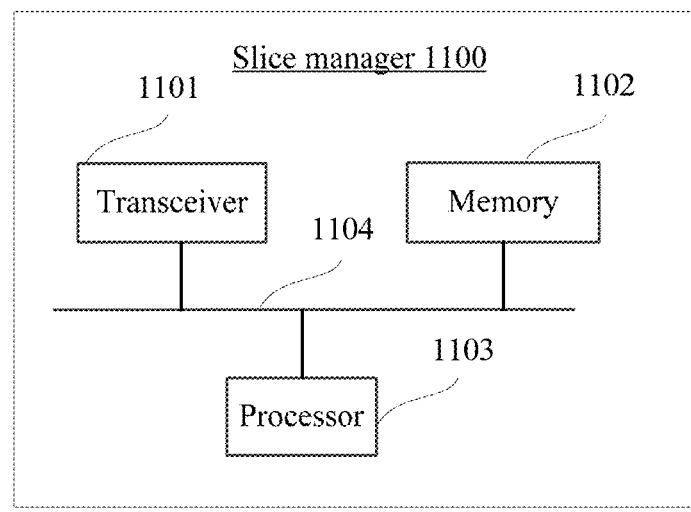
FIG. 11 is a schematic structural diagram of a slice manager according to another embodiment of this patent application.

FIG. 11 is a possible schematic structural diagram of a slice manager used in the foregoing embodiments. As shown in FIG. 11, the slice manager 1100 includes a transceiver 1101, a memory 1102, and a processor 1103. The memory 1102 is configured to store an instruction. The processor 1103 is separately connected to the memory 1102 and the transceiver 1101, and is configured to execute the instruction to perform the following steps when executing the instruction: sending a radio access network slice generation request message to a radio access network by using the transceiver 1101; and receiving, by using the transceiver 1101, a radio access network slice generation response message sent by the radio access network. The radio access network slice generation request message includes information about a service type, and the radio access network slice generation response message is used to indicate that the radio access network generates a radio access network slice. A protocol stack corresponding to the service type is configured for the radio access network slice.

Optionally, when executing the instruction, the processor 1103 further performs the following steps: sending a trigger measurement control message to the radio access network by using the transceiver 1101; and receiving a measurement report message sent by the radio access network. The trigger measurement control message includes a trigger condition. The measurement report message includes the service type, and the service type meets the trigger condition.

Optionally, the transceiver 1101 and the memory 1102 may be directly connected to the processor 1103. Alternatively, as shown in FIG. 11, the transceiver 1101 and the memory 1102 are connected to a bus 1104, and the processor 1103 is also connected to the bus 1104.

Figure 12:
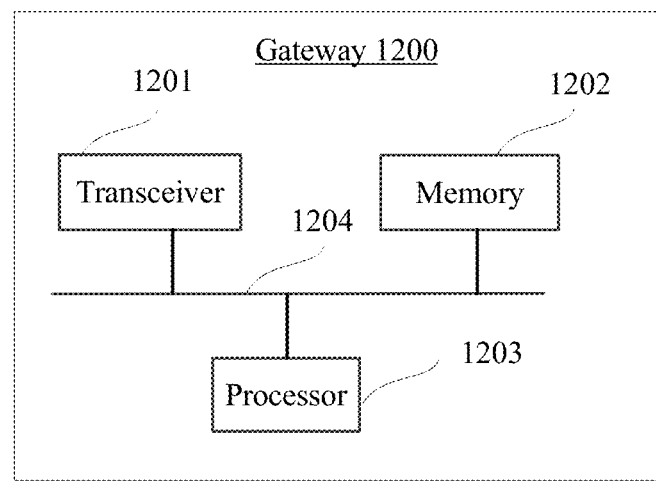
FIG. 12 is a schematic structural diagram of a gateway according to another embodiment of this patent application.

FIG. 12 is a possible schematic structural diagram of a gateway used in the foregoing embodiments. As shown in FIG. 12, the gateway 1200 includes a transceiver 1201, a memory 1202, and a processor 1203. The memory 1202 is configured to store an instruction. The processor 1203 is separately connected to the memory 1202 and the transceiver 1201, and is configured to execute the instruction to perform the following steps when executing the instruction: receiving, by using the transceiver 1201, a radio access network slice access request message sent by a radio access network; and sending a radio access network slice access response message to the radio access network by using the transceiver 1201. The radio access network slice access request message includes information about a service type. The radio access network slice access response message is used to indicate that the gateway allows access of a radio access network slice.

Optionally, the transceiver 1201 and the memory 1202 may be directly connected to the processor 1203. Alternatively, as shown in FIG. 12, the transceiver 1201 and the memory 1202 are connected to a bus 1204, and the processor 1203 is also connected to the bus 1204.

Figure 13:
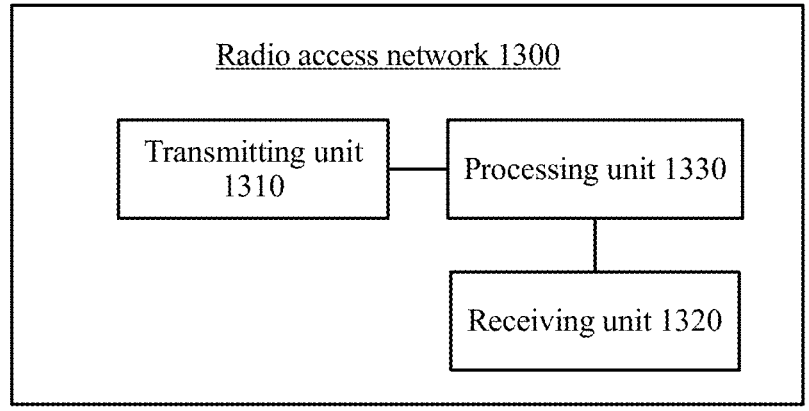
FIG. 13 is a schematic structural diagram of a radio access network according to another embodiment of this patent application.

FIG. 13 is a possible schematic structural diagram of a radio access network used in the foregoing embodiments. As shown in FIG. 13, the radio access network 1300 includes a receiving unit 1320 and a processing unit 1330. The receiving unit 1320 is connected to the processing unit 1330. The receiving unit 1320 is configured to receive a radio access network slice generation request message sent by a slice manager. The processing unit 1330 is configured to generate a radio access network slice. The radio access network slice generation request message includes information about a service type. A protocol stack corresponding to the service type is configured for the radio access network slice.

Optionally, the radio access network further includes a transmitting unit 1310. The receiving unit 1320 is further configured to: before receiving the radio access network slice generation request message sent by the slice manager, receive a trigger measurement control message sent by the slice manager. The transmitting unit 1310 is configured to send a measurement report message to the slice manager. The trigger measurement control message includes a trigger condition. The measurement report message includes the service type, and the service type meets the trigger condition.

Optionally, the radio access network slice generation request message further includes information about a quality of service requirement. The processing unit 1330 is further configured to: when the protocol stack is configured for the radio access network slice and an available resource of the radio access network meets the quality of service requirement, generate the radio access network slice.

Optionally, the transmitting unit 1310 is further configured to send system update information to a terminal device. The system update information includes the service type.

Optionally, the transmitting unit 1310 is further configured to: before the processing unit 1330 generates the radio access network slice, send a radio access network slice access request message to a gateway. The receiving unit 1320 is further configured to receive a radio access network slice access response message sent by the gateway. The radio access network slice access request message includes the service type, and the radio access network slice access response message is used to indicate that the gateway allows access of the radio access network slice.

Optionally, the transmitting unit 1310 is further configured to: after the radio access network slice is generated, send a radio access network slice generation response message to the slice manager. The radio access network slice generation response message is used to indicate that the radio access network generates the radio access network slice.

Figure 14:
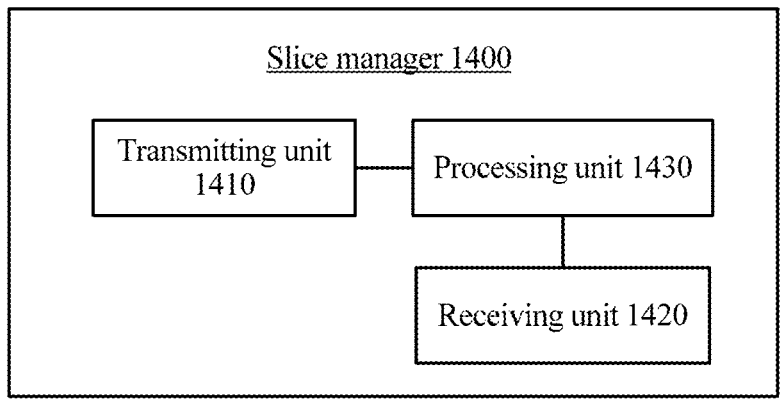
FIG. 14 is a schematic structural diagram of a slice manager according to another embodiment of this patent application.

FIG. 14 is a possible schematic structural diagram of a slice manager used in the foregoing embodiments. As shown in FIG. 14, the slice manager 1400 includes a transmitting unit 1410 and a receiving unit 1420. The transmitting unit 1410 is configured to send a radio access network slice generation request message to a radio access network. The receiving unit 1420 is configured to receive a radio access network slice generation response message sent by the radio access network. The radio access network slice generation request message includes information about a service type. The radio access network slice generation response message is used to indicate that the radio access network generates a radio access network slice. A protocol stack corresponding to the service type is configured for the radio access network slice.

Optionally, the transmitting unit 1410 is further configured to: before sending the radio access network slice generation request message to the radio access network, send a trigger measurement control message to the radio access network. The receiving unit 1420 is further configured to receive a measurement report message sent by the radio access network. The trigger measurement control message includes a trigger condition. The measurement report message includes the service type, and the service type meets the trigger condition.

Optionally, the radio access network slice generation request message further includes information about a quality of service requirement. That the radio access network generates the radio access network slice includes: when the protocol stack is configured for the radio access network slice and an available resource of the radio access network meets the quality of service requirement, generating, by the radio access network, the radio access network slice.

Optionally, the slice processor 1400 may further include a processing unit 1430, and the processing unit 1430 is separately connected to the transmitting unit 1410 and the receiving unit 1420. The processing unit 1430 is configured to process a signal and control the transmitting unit 1410 and the receiving unit 1420.

Figure 15:
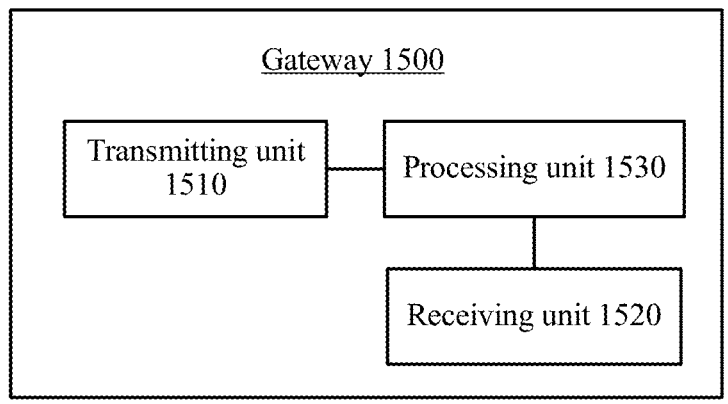
FIG. 15 is a schematic structural diagram of a gateway according to another embodiment of this patent application.

FIG. 15 is a possible schematic structural diagram of a gateway used in the foregoing embodiments. As shown in FIG. 15, the gateway 1500 includes a receiving unit 1520 and a transmitting unit 1510. The receiving unit 1520 is configured to receive a radio access network slice access request message sent by a radio access network. The transmitting unit 1510 is configured to send a radio access network slice access response message to the radio access network. The radio access network slice access request message includes information about a service type, and the radio access network slice access response message is used to indicate that the gateway allows access of a radio access network slice.

Optionally, the gateway 1500 may further include a processing unit 1530, and the processing unit 1530 is separately connected to the transmitting unit 1510 and the receiving unit 1520. The processing unit 1530 is configured to process a signal and control the transmitting unit 1510 and the receiving unit 1520.

In this patent application, a plurality of RAN slices may be generated in one RAN based on a service type, to provide customized services for different service types, and avoid high costs and time-consuming software/hardware upgrading caused by deploying different RANs for different types of services. Therefore, operating and device expenses may be effectively reduced, and a service deployment period is shortened. Further, in this patent application, a quantity of resources deployed for the RAN slice may vary with service load in the RAN in real time, to pertinently meet different service requirements. Therefore, resources can be flexibly allocated, and network performance can be improved.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this patent application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this patent application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this patent application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A method comprising:
 receiving, by a gateway from a radio access network (RAN), a RAN slice access request message, wherein the RAN slice access request message comprises information about a service type;
 sending, by the gateway to the RAN, a RAN slice access response message, wherein the RAN slice access response message comprises context information of the gateway including access capability information;
 after receiving the slice access response message, generating, by the RAN, a RAN slice; and after generating the RAN slice, sending, by the RAN to a slice manager, a RAN slice generation response message, wherein the slice manager is connected to the gateway.

2. The method of claim 1, wherein the service type comprises a mobile broadband (MBB) service or a narrowband internet of things (NB-IoT) service.

3. The method of claim 1, wherein the information about a service type further comprises an operator type.

4. The method of claim 3, wherein the operator type is a virtual network operator type.

5. The method of claim 1, wherein the RAN slice access request message further comprises a tracking area code.

6. The method of claim 1, further comprising:
determining, by the gateway, whether to allow access of the RAN slice based on the service type.

7. A method comprising:
receiving, by a radio access network (RAN) from a slice manager, a RAN slice generation request message, wherein the slice manager is connected to at least one gateway;
sending, by the RAN to the at least one gateway, a RAN slice access request message;
receiving, by the RAN from the at least one gateway, a RAN slice access response message; and
after receiving the slice access response message, generating, by the RAN, a RAN slice, wherein the RAN slice access request message comprises information about a service type.

8. The method of claim 7, wherein the information about a service type further comprises an operator type.

9. The method of claim 7, wherein the RAN comprises one or more RAN slices, a protocol stack corresponding to the service type is configured for the one or more RAN slices.

10. A radio access network (RAN), comprising:
a transceiver;
a memory, configured to store an instruction; and
a processor, wherein the processor is separately connected to the memory and the transceiver, and is configured to execute the instruction to perform the following steps when executing the instruction:
receiving, by using the transceiver, a RAN slice generation request message from a slice manager, wherein the slice manager is connected to at least one gateway;
sending, by using the transceiver, a RAN slice access request message to the at least one gateway, wherein the RAN slice access request message comprises information about a service type;
receiving from the at least one gateway, by the RAN, a RAN slice access response message, wherein the RAN slice access response message comprises context information of the at least one gateway including access capability information;
after receiving the slice access response message, generating, by the RAN, a RAN slice; and
after generating the RAN slice, sending to the slice manager, using the transceiver, a RAN slice generation response message.

11. The RAN of claim 10, wherein the information about a service type further comprises an operator type.

12. The RAN of claim 10, wherein the RAN comprises:
one or more RAN slices; and
the RAN slice access request message further comprises a protocol stack corresponding to the service type for the one or more RAN slices.

13. A gateway comprising:
a transceiver;
a memory, configured to store an instruction; and
a processor, wherein the processor is separately connected to the memory and the transceiver, and is configured to execute the instruction to perform the following steps when executing the instruction:
receiving from a radio access network (RAN), by the transceiver, a radio RAN slice access request message, wherein the RAN slice access request message comprises information about a service type; and
sending to the RAN, by the transceiver, a RAN slice access response message such that:
after receiving the slice access response message, the RAN generates a RAN slice, wherein the RAN slice access response message comprises context information of the gateway including access capability information; and
after generating the RAN slice, the RAN sends to a slice manager, a RAN slice generation response message,
wherein the gateway is communicatively connected to the slice manager and the RAN.

14. The gateway of claim 13, wherein the service type comprises a mobile broadband (MBB) service or a narrowband internet of things (NB-IoT) service.

15. The gateway of claim 13, wherein the information about a service type further comprises an operator type.

16. The gateway of claim 15, wherein the operator type is a virtual network operator type.

17. The gateway of claim 13, wherein the RAN slice access request message further comprises a tracking area code.

18. The gateway of claim 13, wherein when executing the instruction, the processor further performs the following step:
determining, by the processor, whether to allow access of the RAN slice based on the service type.

* * * * *